Figure 1:
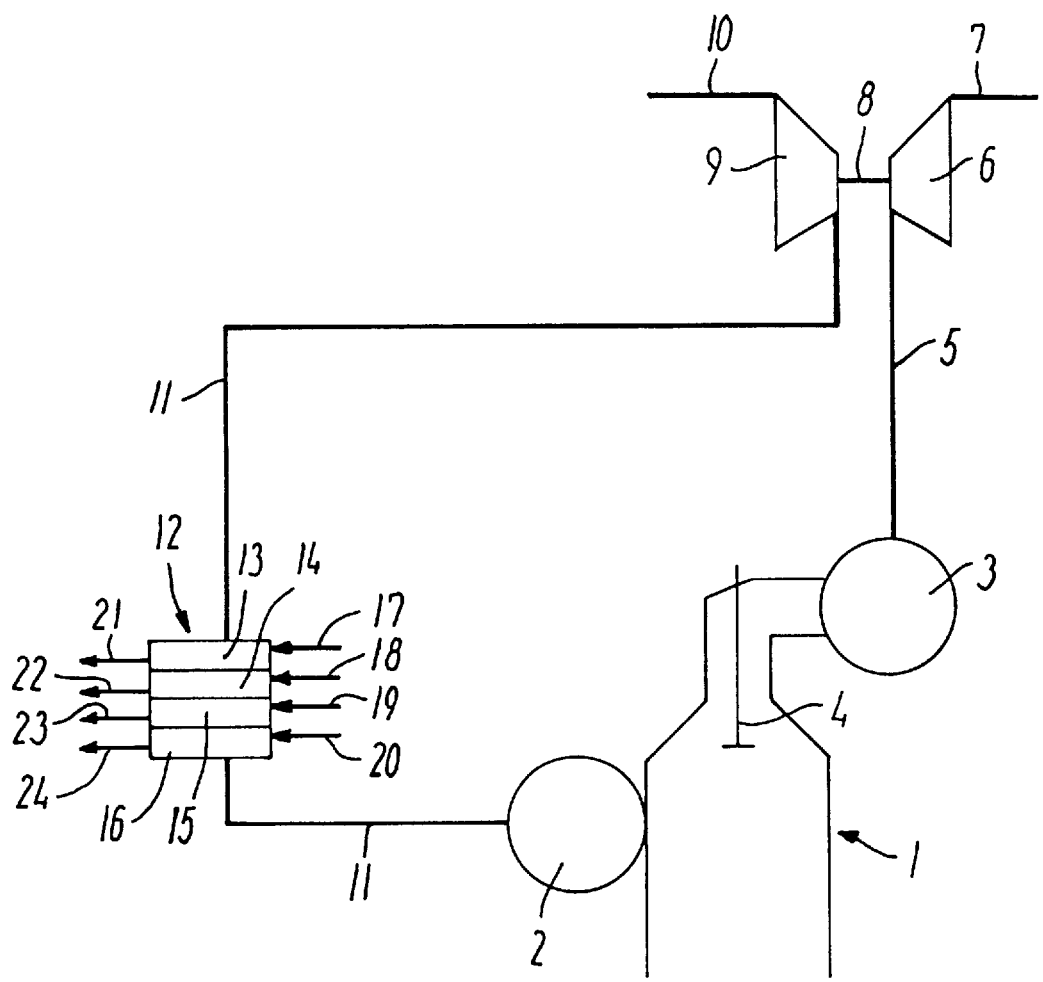

United States Patent [19]
Berg-Sonne

[11] Patent Number: 5,809,981
[45] Date of Patent: Sep. 22, 1998

[54] LARGE SUPERCHARGED INTERNAL COMBUSTION ENGINE AND A METHOD OF OPERATING A COOLER FOR COOLING THE INTAKE AIR OF SUCH AN ENGINE

[75] Inventor: Peter Berg-Sonne, Frederiksberg, Denmark

[73] Assignee: Man B&W Diesel A/S, Copenhagen SV, Denmark

[21] Appl. No.: 557,191

[22] PCT Filed: Dec. 2, 1993

[86] PCT No.: PCT/DK93/00399

§ 371 Date: Dec. 4, 1995

§ 102(e) Date: Dec. 4, 1995

[87] PCT Pub. No.: WO94/29579

PCT Pub. Date: Dec. 22, 1994

[30] Foreign Application Priority Data

Jun. 4, 1993 [DK] Denmark .................................. 0649/93

[51] Int. Cl.⁶ .................................................... F02B 29/04
[52] U.S. Cl. ...................... 123/563; 55/257.3; 123/25 G
[58] Field of Search ............................. 60/599; 123/25 G, 123/563; 55/257.1, 257.3

[56] References Cited

U.S. PATENT DOCUMENTS

| | | | |
|---|---|---|---|
| 1,594,616 | 8/1926 | Heffernan | 123/25 G |
| 1,854,607 | 4/1932 | Andrews | 123/25 G |
| 1,890,107 | 12/1932 | Bowman | 123/25 G |
| 2,258,088 | 10/1941 | Dunn | 123/25 G |
| 3,922,153 | 11/1975 | Engalitcheff, Jr. et al. . | |

FOREIGN PATENT DOCUMENTS

| | | |
|---|---|---|
| 0097097 | 1/1988 | European Pat. Off. . |
| 1015828 | 9/1957 | Germany . |
| 314555 | 4/1969 | Sweden . |
| 1484524 | 9/1977 | United Kingdom . |
| 1496548 | 12/1977 | United Kingdom . |

OTHER PUBLICATIONS

Derwent's abstract, No. 85–170356/28, week 8528, Abstract of SU, A, 1132043(Mosc Region Tractor), Dec. 30, 1984.

*Primary Examiner*—Michael Koczo
*Attorney, Agent, or Firm*—Sughrue, Mion, Zinn, Macpeak & Seas, PLLC

[57] ABSTRACT

A supercharged internal combustion engine (1), such as a main engine of a ship, has a compressor (9) delivering charging and scavenging air to the engine cylinders, and a cooler (12) for cooling the air from the compressor. The cooler (12) is designed to establish direct contact between the scavenging and charging air and the cooling water, preferably by pressure atomization of the water in the air. The cooler (12) has a number of consecutive atomizer sections, and a drop collecting section (33) separating drops of water from the air may be provided between at least two atomizer sections. A delivery pump (49) supplies fresh water to atomizer sections in the cooler, and at least one of the drop collecting sections of the cooler delivers fresh water to a storage tank (50), which tank is pressured to substantially the same pressure as the air pressure in the cooler. The air may be cooled in plural stages (13–16), and sea water may be used for cooling and humidification of the air in the first stage. When the humidity-saturated air is cooled with atomized fresh water in subsequent stages (14–16), the cooler produces a surplus of fresh water.

16 Claims, 4 Drawing Sheets

LARGE SUPERCHARGED INTERNAL COMBUSTION ENGINE AND A METHOD OF OPERATING A COOLER FOR COOLING THE INTAKE AIR OF SUCH AN ENGINE

The invention relates to a large supercharged internal combustion engine, such as a main engine of a ship, having a compressor delivering charging and scavenging air to the engine cylinders, and a cooler for cooling the air from the compressor.

The compression of the intake air in the compressor causes the air temperature to rise. The air is cooled in the cooler before delivery to the cylinders to enable these to be filled with a sufficiently large amount of air for the combustion process to proceed with the desired excess of air.

British patent No. 1 496 548 describes a small diesel engine wherein the intake air passes through a venturi nozzle disposed between a compressor and the engine cylinders. The venturi nozzle sucks up water from a water tank so that the air is cooled by evaporation of the water. The patent states that the cooling method is applicable in engines having an output of less than 150 hp, i.e., very small diesel engines. The cooling obtainable by evaporation is relatively limited and quite insufficient in large diesel engines where the achievement of the best possible combustion conditions is of great importance to the achievement of a good operating economy. The water content of saturated air rises very steeply in step with an increasing air temperature. As a result of the fact that the air temperature after the evaporation cooling is still relatively high, the air contains large amounts of water at the inlet to the combustion chambers, which has a negative effect on the combustion and results in a very large water consumption which would reach quite unacceptable levels in large engines.

For many years, in large two-stroke diesel engines, the cooler has been designed as a pipe fin cooler, in which the cooling water flows through the pipes and the air is directed past closely spaced fins mounted on the outside of the pipes. The use of a pipe fin cooler has conventionally been justified by the facts that the cooler has a large surface area on the air side, and that this type of cooler is able to carry away the very large amounts of heat formed by compression of the intake air in large two-stroke engine to a pressure of more than 3 bar, for example.

The pipe fin coolers require significant maintenance, partly because the fins catch impurities from the air, partly because the cooler uses sea water resulting in depositions and oxide formation on the inside of the pipes, partly because the water has a corrosive effect on the pipes, especially if the cooling water contains pollutants, such as sulphur sulphide and ammonia, which have a strongly erosive effect on copper alloys. The depositions on pipes and fins have an insulating effect and consequently hamper the cooling of the air. Thus, at regular intervals, it is necessary to clean the cooler for depositions and check its condition, which requires work and is costly. As a result of the corrosive erosion of pipes and fins, the pipe fin cooler has a substantially shorter life than the engine and normally has to be replaced during the life of the engine. These disadvantages have been accepted for a large number of years by shipowners and at stationary power plants where large internal combustion engines are used to drive generators.

The object of the invention is to provide a cooler for the intake system of a large engine, which cooler has a large cooling capacity, functions efficiently and is operationally reliable, and only requires slight maintenance.

In view of this object, the engine according to the invention is characterized in that the cooler is designed to establish direct contact between the scavenging and charging air and the cooling water by pressure atomization of the water in the air, that the cooler has a number of consecutive atomizer sections, and that a drop collecting section separating drops of water from the air is provided between at least two atomizer sections.

The cooler as a whole has no major water consumption despite the cooling being effected by means of pressure atomization of water. This is due to the fact that after humidification, the air is cooled to a temperature near that of the cooling water so that the water content of the air is seduced to a very low level, and the atomized water is reclaimed from the air.

By injecting the water directly into the air, extremely high coefficients of heat transfer may be obtained between the water and the air, and thus an efficient and quick-acting cooling. Tests have shown that the direct contact between the water and the air may result in coefficients of heat transfer being from 50 to 100 times higher than the heat transfer coefficients in a pipe fin cooler, where the heat has to be transported through the fins and the pipe walls. The high coefficients of heat transfer render it possible to reduce the amount of cooling water, which results in lower energy consumption for pumping the water, just as the pipe systems and the pumps may be of smaller dimensions. As the cooler does not use internal cooling pipes, maintenance thereof is naturally eliminated.

No considerations of the heat conduction properties of the materials have to be taken into account in the choice of material for the cooler, and contrary to the known pipe fin cooler, the materials may therefore be chosen on the basis of other factors, such as their ability to withstand corrosive attacks from air and cooling water, which gives the cooler a long and largely maintenance-free life.

The pressure atomization of the water in the air renders possible ejection of very large amounts of water in the air so that the cooling effect is obtained partly by evaporation of the water, partly by direct transfer of heat between air and water. Injection of an amount of water which is many times larger than the amount of water required for humidification of the air, results in a very satisfactory cooling of the air, viz., a cooling comparable to or better than the cooling obtained by the known pipe fin coolers. The pressure atomization results in fine drops of water in the air and thus a large contact surface between water and air. As the water atomization means only take up little space in the cooler, the pressure drop of the air over the cooler becomes substantially smaller than in the known pipe fin coolers, which contributes to an improvement in the efficiency of the engine.

In each of the atomizer sections of the cooler, the air is subjected to drastic cooling, and the cooling in several stages renders possible cooling to a few degrees above the inlet temperature of the cooling water. At the first cooling stage, humidification of the air to 100 per cent relative humidity will automatically occur simultaneously with cooling. The amount of water in humidity-saturated air increases heavily with increasing temperatures, and the cooling in the stages subsequent to humidification therefore results in condensation of fresh water from the air.

The use of a drop collecting section after an atomizer section contributes to achieving efficient cooling in the subsequent atomizer section, as cooling of the water carried away by the drop collector is avoided. In the atomizer section where the air is cooled below the dewpoint, any particles in the air will act as drop nucleation agents or drop initiators where the particles are caught in the drops, and in the subsequent drop collecting section the particles will be removed together with the drops so that the air is purified. The water atomization will further give an extra scrubber effect able to remove other impurities from the air. Thus, the air is purified in the first condensing section.

If there is yet another atomizer section after a section with air purification, the cooling of the air will here result in condensation of high-quality fresh water. Thus, in a ship the cooler may produce fresh water for use on board the ship. This entails the substantial advantage that the cooler may make the usual fresh water generators superfluous which evaporate water at such low pressure that waste heat from the engine may be utilized for evaporation. In any case, the intake air has to be cooled, and by separating fresh water in connection with this cooling, a primary heat source is used for the fresh-water production, which improves the total efficiency of the engine plant, as no secondary pumping systems and secondary energy-consuming equipment for the fresh water production are required. Additionally, there are obvious advantages as regards costs and maintenance in reducing the number of components in the engine plant.

If a drop collecting section is arranged after the last atomizer section of the cooler, the drop collector will prevent deposition of water in the intake system downstream of the atomizer section and reduce the amount of water in the air to a level, where the water content only has a positive effect on the engine process. It is especially advantageous to prevent the presence of large drops in the gas flowing into the combustion chamber, as deposition of large drops on the internal side of the cylinder wall may render difficult the maintenance of the thin lubricating oil film on the cylinder wall.

With a view to facilitating the removal of fine drops, in particular, in the air, the cooler may suitably have a drop generating section between the atomizer section and the drop collecting section, in which fine drops of liquid in the air are joined into somewhat larger drops which are easier to remove in the drop collecting section. The drop generating section results in an increase in the pressure drop of the air over the cooler, but on the other hand the drop removal becomes so efficient that the cooler may be given advantageously small external dimensions.

In a particularly simple and compact embodiment, the cooler has a number of nozzles in an atomizer section, which nozzles eject atomized water against the direction of flow of the gas, and beside or immediately in front of the nozzles, drop collectors have been disposed in the form of surfaces which are inclined in relation to the direction of flow of the gas. The counter-current ejection of atomized water results in a rapid and fine distribution of the water in the air, and at the same time, the atomizer section has a short length in the gas flow direction. In consequence of the very high coefficient of heat transfer between the atomized water and the air, the most substantial part of the possible cooling action has already been obtained when the air flow has reached the atomizer nozzles. The drop collectors may therefore be disposed beside or immediately in front of the nozzles, which further reduces the extent of the cooler in the direction of flow. The surfaces inclined in relation to the direction of gas flow impart a change of direction to the air current. The water drops have a substantially larger density than the air and will only be deflected to a smaller degree owing to their inertia, and the drops therefore hit and adhere to the inclined surfaces, which may carry away the collected water.

In a preferred embodiment, a delivery pump supplies fresh water to atomizer sections in the cooler, and at least one of the drop collecting sections of the cooler delivers fresh water to a storage tank which is pressurized to substantially the same pressure as the air pressure in the cooler. In order to achieve proper atomization, the pressure in the inlet pipe to the atomizer has to exceed the air pressure in the cooler by a value dependent on the design of the atomizer nozzles. In consideration of the removal of water from the drop collecting section, the pressure of the storage tank should be slightly below the air pressure of the cooler. Pressurization of the tank has the advantage that the delivery pump need only impart to the cooling water a pressure increase suitable for atomization of the water, and the pump is relieved of the work of pumping the water up to a level with the air pressure in the cooler.

The invention also relates to a method of operating a cooler for cooling the intake air of a supercharged internal combustion engine with atomized water, after the air has left a compressor, and before the air is delivered to the combustion chambers of the engine. The method is characterized in that the air is cooled in a number of stages by means of pressure atomization of water, that water of freely available quality is atomized in the air in the first stage of the cooler, whereupon drops of water are removed from the air, and that fresh water is atomized in the air in a subsequent stage, whereupon drops of water are removed from the air.

In addition to the above advantages of establishing direct contact between the cooling water and the air, the method renders it possible to use water which is not necessarily pure, fresh water for humidification and cooling of the air in the first stage. If there are suitable amounts of water of a lower quality near the engine plant, i.e. non-potable water, such as sea water or unpurified surface water from lakes, or other water which has been used for industrial purposes, this water may be used in the first stage, as the evaporation and condensation processes in the cooler result in a purification of the water, and the fresh water atomized in the air in the subsequent stage purifies the air of any impurities. In this manner, it is possible to save an amount of fresh water corresponding to the amount of water used for humidification of the air.

Fresh water may suitably be atomized in the air in two consecutive stages, and water removed from the air in the last fresh-water stage may be delivered to a storage tank. As mentioned above, the cooling in the first or second fresh-water stage will result in an actual production of pure fresh water which is collected in the storage tank. With this method, the cooler not only becomes self-sufficient with fresh water, but it is even possible to tap the surplus production from the storage tank and use it for other purposes.

If the engine is a ship's engine or an engine in a coastal power station, the first stage may suitably use sea water which is available in large amounts. As mentioned, the cooler converts a large part of the sea water into fresh water. Diesel-operated stationary power stations are often used in areas suffering from a shortage of fresh water. The fresh water produced may be used directly for, for example, irrigation of fields.

The energy consumption of the engine plant may suitably be reduced by mixing water removed from the second atomizer stage with the water to be atomized in the air in the first stage of the cooler. The water removed from the second atomizer stage will have largely the same pressure as the air pressure in the stage, and returning the water to the first stage results in a saving of the pump work required to pressurize the water from the ambient pressure to the air pressure of the first stage.

In a method suitable for the achievement of a large fresh-water production, the amount of water in the first stage is adapted to the temperature, amount and water content of the intake air so that at its discharge from the first stage, the air has not been cooled substantially below its dewpoint. Thus, the air in the first stage is humidified by a maximum amount of water which, after the purification in the second stage, may be condensed in the third or subsequent stages.

Figure 2:
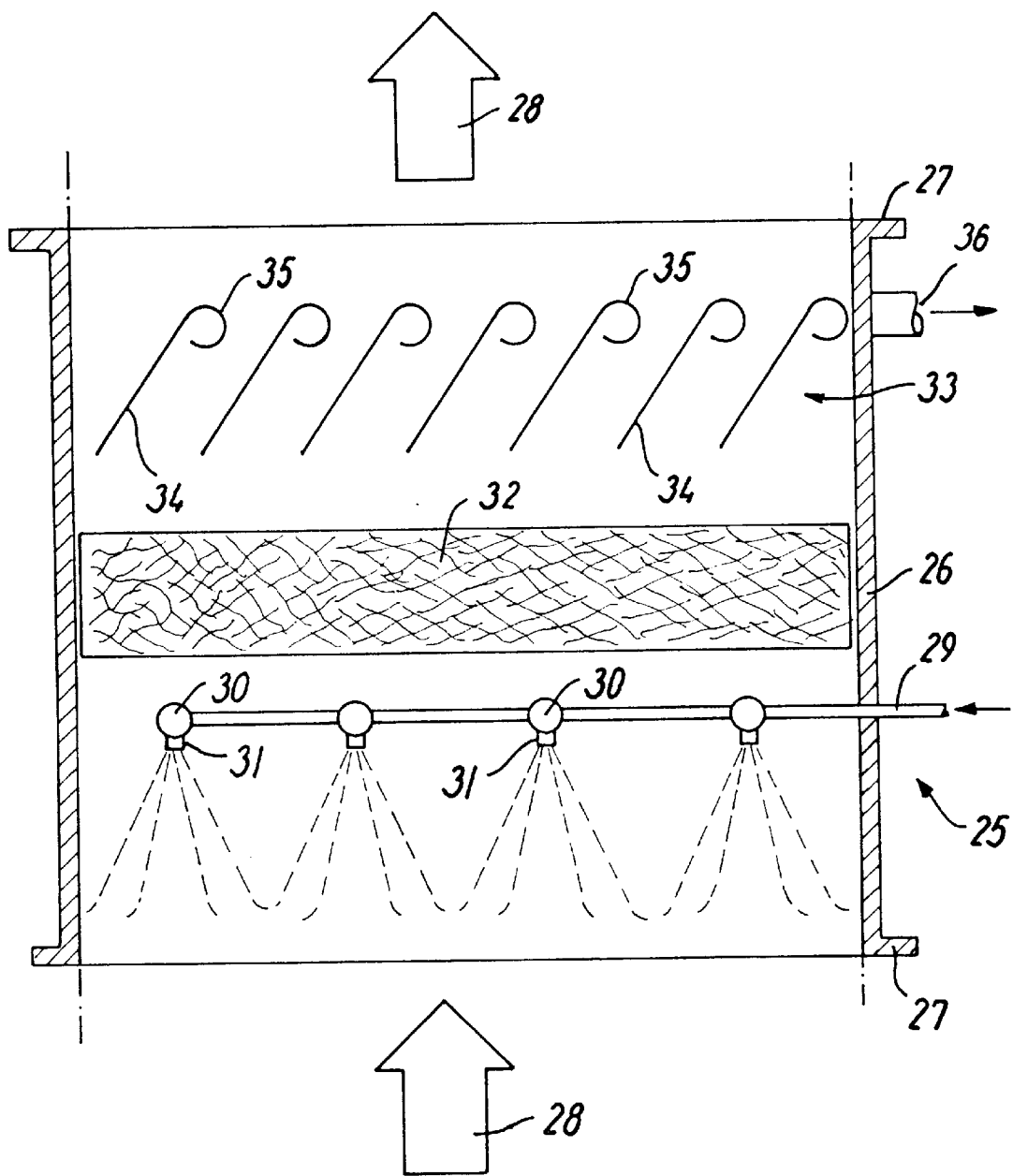
Figure 3:
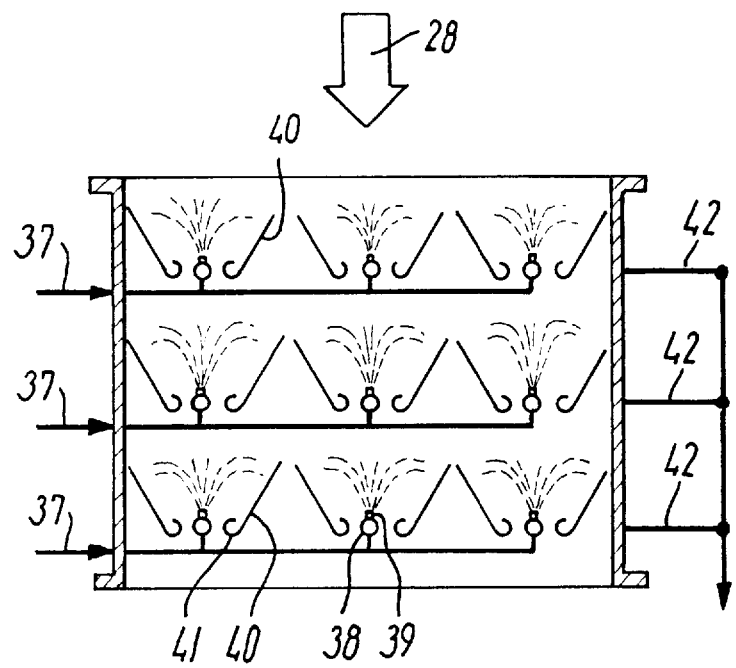
Figure 4:
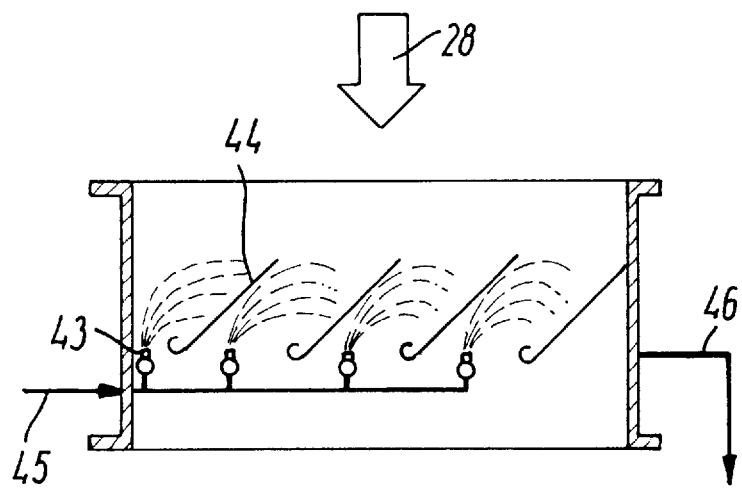
Figure 5:
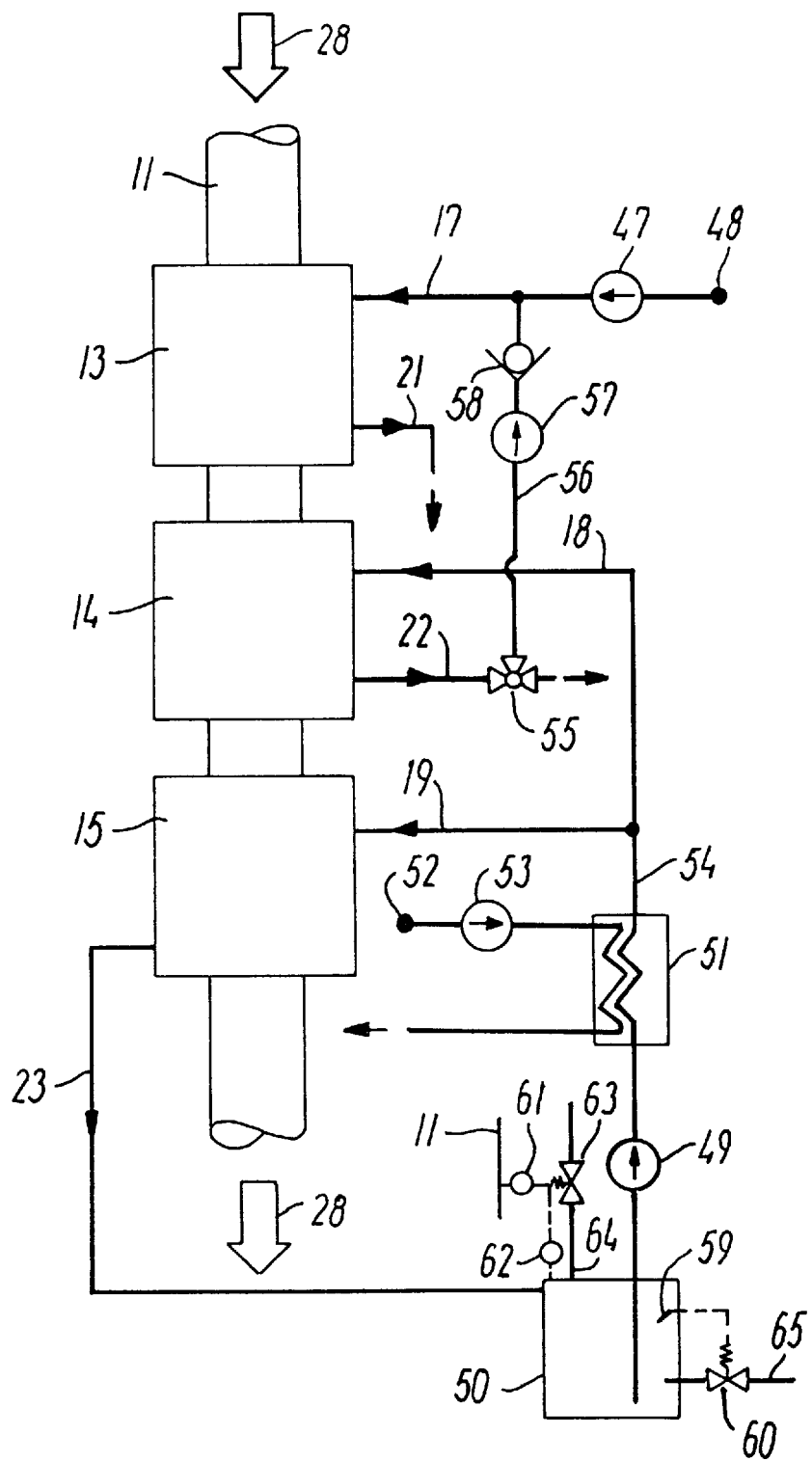

Examples of embodiments and of the method of the invention will now be described in further detail below with reference to the very schematic drawing, in which FIG. 1 illustrates a diagram of an embodiment of the intake and exhaust system in an internal combustion engine according to the invention, FIG. 2 is a horizontal section of an outline of a stage in a cooler, FIGS. 3 and 4 show a second and a third embodiment of atomizer and drop collecting sections of the cooler, and FIG. 5 is a diagram of the connections to a three-stage cooler.

FIG. 1 shows a large internal combustion engine generally designated 1 and having a scavenging and charging air receiver 2 and an exhaust receiver 3. A large internal combustion engine is understood to be an engine having an output of more than 1000 kW. The engine may be constant-pressure-charged or pulse-charged. 4 indicates the exhaust valves associated with the combustion chambers of the engine. Cooling of the intake air normally occurs in medium-size and large two and four-stroke engines, and the invention is particularly applicable in large two-stroke diesel engines of the crosshead type, which produce a very large output, for example from 5000 to 75000 kW. As a consequence of the requirements of these engines to high charging pressures with consequent high pressure ratios of up to 1:4.5 for the compressor, it is particularly important that the intake air is cooled before delivery to the combustion chambers. For the sake of simplicity, the scavenging and charging air will be called the charging air hereafter.

The charging air is passed from the charging air receiver to the scavenging air ports of the individual cylinders. When the exhaust valve 4 is opened, the exhaust gas flows through an exhaust conduit into the exhaust receiver 3 and onwards through a conventional exhaust conduit 5 to a turbine 6 of a turbocharger, from which the exhaust gas flows away through an exhaust conduit 7. Through a shaft 8, the turbine 6 drives a compressor 9 supplied via an air inlet 10. The compressor 9 delivers pressurized charging air to a charging air conduit 11 leading to the charging air receiver 2.

The intake air in the conduit 11 passes through a cooler 12 having four atomizer stages 13–16 in the embodiment shown. In the first stage 13, water of generally available quality, such as sea water, is passed through a pipe 17 to atomizer nozzles in an amount which humidifies, cools, and purifies the gas. The first stage 13 is adapted to the temperature amount and water content of the intake air so that at its discharge from the first stage the air has not been cooled substantially below its dewpoint. A suitable excess of water is supplied so that no particles are precepitated in the gas, such as salt or other impurities from the water. At discharge from the first section, the air has been cooled to near the dewpoint. In the second stage 14, fresh water supplied through a pipe 18 is atomized in the gas and thus causes a further cooling with subsequent water condensation on any particles in the gas. In the third stage 15, fresh water supplied through a pipe 19 is atomized in the air which is here cooled to a temperature corresponding to the air discharge temperature from a conventional pipe fin cooler. In the fourth stage 16, water supplied through a pipe 20 is atomized in the gas, which is cooled to a few degrees above the cooling water temperature with continued condensation of a relatively limited amount of fresh water. From each stage, condensed and excess water is drained away through drainage or discharge pipes 21–24. It is possible to use fewer stages in the cooler. The number of stages is adapted, among other things, to the output of the engine and to the need for producing fresh water. If the intake air contains impurities, they will be washed out in the first and possibly also the second cooler stage, so that it may be necessary to purify the water discharged through pipes 21 and 22, depending on the type of pollutants. If the water supplied to the first stage contains impurities, water discharged through the pipe 22 may also be impure. Water discharged through pipes 23 and 24 will normally be high-quality fresh water. If the first stage of the cooler causes a sufficiently efficient purification of the intake air, the cooler may be designed with only two stages, viz., a first humidification, purification and cooling stage, and a second fresh-water producing cooling stage.

FIG. 2 shows an example of the design of a stage 25 in the cooler. The housing 26 of the cooler may be connected with the charging air conduit 11 by means of flanges 27 or with an adjacent cooler stage. The gas flow direction is indicated by arrows 28. An inlet pipe 29 for, for example, fresh or sea water passes the water to distributor tubes 30 each carrying a number of nozzles 31 which pressure atomize the water into the gas. In the embodiments shown, the nozzles spray the water out against the direction of flow of the gas, which gives a good evaporation and purification effect, but it is, of course, also possible to use nozzles spraying in the same direction as the flow direction of the air. After passage of the nozzles, the gas flows through a drop generator 32 containing large surfaces which are angled in relation to the direction of flow of the gas. The material of the drop generator may, for example, consist of very porous foam, wire mesh or steel wool. In the drop generator, small liquid drops in the gas will join together into larger drops, which facilitates the subsequent removal of the drops from the gas in a drop collecting section 33 which, as shown, may contain elongated plate sections 34 which are inclined in relation to the direction of flow of the gas so that the gas is forced to change its direction upon passage of the plates. As a consequence of the inertia of the drops, they will be slower to change their flow direction than the gas itself, and the drops will therefore land on the plates 34 and slide along them into a folded-over end portion 35 where the drops are caught and passed to a collecting channel discharging the condensate and the removed liquid to a discharge pipe 36. It will often be possible to omit the drop generator 32, which may cause a certain flow resistance. If the cooler has a number of consecutive atomizer stages, each stage suitably contains a drop collecting section so that subsequent stages do not have to cool the amount of liquid removed in the drop collecting section. The cooler only yields low flow resistance and requires substantially no maintenance and is also cheap to manufacture.

The cooler will normally be mounted so that the direction of air flow indicated by the arrows 28 is substantially horizontal, which facilitates the removal of drops in the drop collecting section 33, because the plates 34 then extend in the direction of height of the cooler (out of the plane of the paper in FIG. 2). The water caught in the end portion acting as a throating may then run down into the collecting channel itself owing to gravity. Alternatively, the cooler may be mounted so that the direction of air flow is obliquely upwards, downwards or vertical.

As shown, the nozzles 31 may be pure water nozzles, but especially for the first stage 13, where sea water may be supplied, it may be advantageous to use twin-substance nozzles supplied with charging air branched off from the conduit 11 and with the salt water passed into the air flow in the nozzle and atomized in it. With such an atomization it is possible to obtain very fine droplets of a uniform size, even after a long period of operation, as no use is made of pressure nozzles with a small nozzle aperture which may be soiled or blocked by impurities.

The cooler may also be designed as outlined in FIG. 3, where the cooler has three atomizer sections built together with drop collecting sections so that the cooler is of short length. In each section, a cooling water inlet pipe 37 communicates with several distributor pipes 38 carrying atomizer nozzles 39 which may be of the cone type, viz., nozzles that eject a conical mist of atomized water. The guide plates 40 of the drop collector extend in parallel with the distributor pipe 38 and are positioned flow-wise immediately downstream of or on a level with the atomizer nozzles, preferably so that the throatings 41 of the guide plates are positioned at the downstream side of the nozzles, and the largely plane sections of the guide plates project obliquely in front of the nozzles at an angle corresponding to the cone angle. Excess water and condensate are carried away through pipes 42. If a particularly efficient cooling of the air is desired, the three atomizer sections may be arranged downstream of a humidification and purification section.

The embodiment of an atomizer stage shown in FIG. 4 yields very little resistance to the air flow through the cooler. This has been achieved through the use of atomizer nozzles 43 of a fan-shaped type, of which each cooperates with a single guide plate 44 positioned on the side of the nozzle at which the fan-shaped mist of atomized water is directed. As the guide plates all extend in the same direction, the pressure drop over the drop collection section is smaller. The atomizer section is supplied with water through a pipe 45, and water from the drop collecting section is carried away through a pipe 46.

FIG. 5 illustrates a diagram of the connections to a three-stage cooler. As mentioned, the cooler of FIG. 1 may comprise only three stages, and for the sake of simplicity, the reference numerals from the three first cooler stages in FIG. 1 are used in FIG. 5. It is presumed that the cooler is used in a ship engine plant, and that the inlet pipe 17 to the first atomizer stage is supplied with sea water by means of a delivery pump 47 supplied from a sea valve 48. Excess water from the first drop collecting section is passed overboard through the pipe 21.

A delivery pump 49 draws fresh water from a storage tank 50 and passes the water through a plate cooler 51, in which the fresh water is cooled by sea water which is passed through the cooler by means of a pump 53 drawing from a sea valve 52. Through a discharge pipe 54, the fresh water is distributed to the inlet pipes 18 and 19 for the second and third atomizer stages. Excess water and condensate from the second drop collecting stage is carried away through the pipe 22. A valve 55 in the pipe 22 may pass the water away from the cooler system in one position, and in another position via a pipe 56 connect the pipe 22 with the inlet pipe 17 for the first atomizer section. The pipe 56 comprises a small pump 57 which may bring the pressure of the return water to the level of the output pressure from the pump 47. A non-return valve 58 in the pipe 56 prevents water from the pipe 17 from penetrating into the pipe 56.

The drainage pipe 23 from the third drop collecting section delivers the fresh water to the storage tank 50. The storage tank is provided with a level switch 59 which actuates a valve 60 in a discharge pipe 65 on the tank so that the excess production of fresh water of the cooler may be carried away at regular intervals through the pipe 65 for use elsewhere on the ship. The fresh water may be conditioned for use as drinking water, but it may also be directly used as washing, rinsing or flushing water. A pressure sensor 61 measures the pressure in the conduit 11 upstream of the cooler, and another pressure sensor 62 measures the pressure in the storage tank. An adjustable valve 63 in a pressurized air pipe 64 connected with the storage tank is controlled on the basis of a signal emitted by the sensors 61 and 62 so that the pressure of the storage tank is kept at such a suitably lower level than the pressure of the conduit 11 that the water from the pipe 23 may unimpededly flow into the storage tank. The pressurization of the storage tank reduces the work of the pump 49. The tank further comprises a pressure discharger, not shown, which is actuated when the charging air pressure in the conduit 11 drops. Alternatively, the tank may be pressurized by through-flowing air removed from the conduit 11 and supplied to the tank 50 through a throttling passage.

A description of examples of the method of operation of a cooler according to the invention follows, where the charging air is cooled in two stages. For the sake of simplicity, the examples relate to an internal combustion engine with a full-load output of 10000 kW and a nominal scavenging air pressure of 3.55 bar. For engines of higher outputs, the amounts of flow stated in the examples may just be scaled in proportion to the output.

EXAMPLE 1

The engine operates at a 100 per cent load, and ambient air has a temperature of 25° C. and a relative humidity of 30 per cent, which means that the intake air will contain about 6 g of water/kg of air. The air consumption of the engine is about 22 kg/s. Downstream of the compressor 9, the temperature of the air is $T_L=185°$ C.

In the first atomizer stage, the nozzles are supplied with an amount of sea water of 2.6 l/s, whereby the air is cooled by evaporation to a temperature of about $T_L=70°$ C., and the air is at the same time humidified to 100 per cent relative humidity, resulting in a water content of 60 g/kg of air. In the first drop collecting section, a water amount of about 1.3 l/s is removed. At its discharge from the first cooler stage, the air is largely purified of any salt content.

In the second atomizer stage, a fresh water amount of 35 l/s is sprayed out through the atomizer nozzles at a water temperature of about $T_V=25°$ C. This cools the air to a temperature of about $T_L=35°$ C., where the 100 per cent humidity-saturated air has a water content of about 9 g/kg of air. In the second drop collecting section, a water amount of about 36.1 l/s is separated, whereby the second cooler stage produces an amount of fresh water of 1.1 l/s, corresponding to about 95 tons per day. If desired, the charging air may be cooled in a third and optionally also a fourth cooler stage to a few degrees above the temperature of the cooling water, which will result in a further production of fresh water, and at the same time the very low temperature of the charging air will result in an improvement of the specific fuel oil consumption of the engine of about 1 g/hph.

EXAMPLE 2

With the same ambient conditions as above and an engine load of 75 per cent, the nozzles in the first atomizer stage have to be supplied with an amount of sea water of at least 1.8 l/s, whereby the air is cooled to about $T_L=60°$ C. and humidified to 100 per cent relative humidity, where the water content is of about 45 g/kg of air.

At the second atomizer stage, a water amount of 35 l/s is supplied at a temperature of about $T_V=25°$ C., whereby the charging air is cooled to about $T_L=30°$ C., where the water content in the 100 per cent saturated air is about 12 g/kg of air. The second stage produces an amount of fresh water of about 0.5 l/s corresponding to 43 tonnes per day.

EXAMPLE 3

At 100 per cent engine load and tropical ambient conditions, where the air temperature is $T_L=45°$ C., and the air has a water content of 38 g/kg of air, the first atomizer section is supplied with an amount of sea water of 4 l/s, whereby the charging air is cooled to a temperature of about $T_L=90°$ C. and the water content is of about 100 g/kg of air.

In the second scrubber stage, a fresh water amount of 35 l/s is supplied, and the gas is cooled to about $T_L=45°$ C., where the water content is about 17 g/kg of air. An amount of fresh water of about 1.7 l/s corresponding to 146 tonnes per day is thus produced.

The engine shown in FIG. 1 is turbocharged. It is evident that the invention may be used in other types of supercharged internal combustion engines, for example an engine having a compressor which is mechanically driven or driven by an electric motor.

I claim:

1. A supercharged internal combustion engine comprising; a compressor delivering charging and scavenging air to the engine cylinders, a cooler using cooling water to cool the air delivered from the compressor, said cooler having a number of consecutive atomizer sections in which the cooling water is pressure atomized into the air, and a drop collecting section is provided between at least two atomizer sections, said drop collecting section separating drops of water from the air.

2. An internal combustion engine as claimed in claim 1, further comprising a delivery pump supplying cooling water in form of fresh water to atomizer sections in the cooler, a second drop collecting section, and at least one of the drop collecting sections of the cooler delivers fresh water to a storage tank pressurized to substantially the same pressure as air pressure in the cooler.

3. An internal combustion engine as claimed in claim 2, further comprising a drop generating section between the atomizer section and the drop collecting section of said cooler.

4. An internal combustion engine as claimed in claim 3, wherein in at least one of said atomizer sections the cooler has a number of nozzles ejecting atomized cooling water against the direction of flow of the gas, and proximate the nozzles, drop collectors are disposed in the form of surfaces which are inclined in relation to the direction of flow of the gas.

5. An internal combustion engine as claimed in claim 4, wherein the engine is a ship main engine.

6. An internal combustion engine as claimed in claim 5, further comprising a delivery pump supplying cooling water in form of fresh water to atomizer sections in the cooler, a second drop collecting section, and at least one of the drop collecting sections of the cooler delivers fresh water to a storage tank pressurized to substantially the same pressure as air pressure in the cooler.

7. A supercharged internal combustion engine comprising; a compressor delivering charging and scavenging air to the engine cylinders, a cooler using cooling water to cool the air delivered from the compressor, said cooler having a number of consecutive atomizer sections in which the cooling water is pressure atomized into the air, a drop collecting section which is provided between at least two atomizer sections and separates drops of water from the air, and at least one of said atomizer sections having a number of nozzles ejecting atomized cooling water against the direction of flow of the gas, and proximate the nozzles, drop collectors are disposed in the form of surfaces which are inclined in relation to the direction of flow of the gas.

8. A supercharged internal combustion engine of claim 7 wherein said drop collectors are positioned immediately in front of said nozzles.

9. A supercharged internal combustion engine of claim 8 wherein said drop collectors are positioned beside said nozzles.

10. A method of operating a cooler for cooling intake air of a supercharged internal combustion engine having combustion chambers, after the air has left a compressor and before the air is delivered to the combustion chambers, comprising the steps of cooling said intake air in a number of stages only by means of pressure atomization of cooling water, atomizing cooling water in the air in the first stage of the cooler, subsequently removing drops of water from the air, and atomizing fresh water in the air in at least one subsequent stage.

11. A method as claimed in claim 10, wherein fresh water is atomized in the air in two consecutive stages, and the water removed from the air in the last fresh water stage is delivered to a storage tank.

12. A method as claimed in claim 11, wherein the water removed from the second atomizer stage is mixed with the water to be atomized in the air in the first stage of the cooler.

13. A method as claimed in claim 10, wherein non-potable water is atomized in the air in said first stage of the cooler and fresh water is atomized in the air in at least one subsequent stage of the cooler.

14. A method as claimed in claim 13, wherein water reclaimed from the second stage of the cooler is mixed with non-potable water to be atomized in the air in the first stage of the cooler.

15. A method as claimed in claim 13, wherein fresh water is atomized in the air in at least two consecutive stages subsequent to the first stage of the cooler, and fresh water is removed from the air in the last fresh water stage in amounts larger than fresh water used in said consecutive stages.

16. A method as claimed in claim 10, wherein the air is not cooled substantially below its dewpoint at its discharge from the first stage of the cooler.

* * * * *